United States Patent
Wells

(10) Patent No.: US 10,034,152 B2
(45) Date of Patent: *Jul. 24, 2018

(54) SHORT MESSAGE SERVICE MANAGEMENT SYSTEMS AND METHODS

(71) Applicant: Kool Telecom Ltd., Toronto (CA)

(72) Inventor: Andrew Thomas Wells, Toronto (CA)

(73) Assignee: Kool Telecom Ltd., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/687,912

(22) Filed: Aug. 28, 2017

(65) Prior Publication Data

US 2017/0359705 A1 Dec. 14, 2017

Related U.S. Application Data

(63) Continuation of application No. 14/971,760, filed on Dec. 16, 2015, now Pat. No. 9,763,068, which is a continuation-in-part of application No. 14/737,255, filed on Jun. 11, 2015, now Pat. No. 9,485,362.

(60) Provisional application No. 62/012,144, filed on Jun. 13, 2014.

(51) Int. Cl.
| | |
|---|---|
| *H04W 4/00* | (2018.01) |
| *H04W 4/14* | (2009.01) |
| *H04W 4/18* | (2009.01) |
| *H04L 29/08* | (2006.01) |
| *H04M 3/54* | (2006.01) |
| *H04M 7/00* | (2006.01) |
| *H04M 3/42* | (2006.01) |
| *H04W 4/50* | (2018.01) |
| *H04W 88/16* | (2009.01) |
| *H04M 1/725* | (2006.01) |

(52) U.S. Cl.
CPC .............. *H04W 4/14* (2013.01); *H04L 67/04* (2013.01); *H04M 3/42382* (2013.01); *H04M 3/546* (2013.01); *H04M 7/0024* (2013.01); *H04W 4/18* (2013.01); *H04W 4/50* (2018.02); *H04M 1/72561* (2013.01); *H04M 2242/04* (2013.01); *H04W 88/16* (2013.01)

(58) Field of Classification Search
CPC ............................... H04W 4/14; H04M 3/546
USPC .................................................. 455/466, 555
See application file for complete search history.

(56) References Cited

U.S. PATENT DOCUMENTS

| | | |
|---|---|---|
| 9,485,362 B2 | 11/2016 | Wells |
| 9,763,068 B2 | 9/2017 | Wells |
| 2001/0006889 A1 | 7/2001 | Kraft |
| 2010/0304766 A1 | 12/2010 | Goyal |
| 2015/0365533 A1 | 12/2015 | Wells |
| 2016/0105781 A1 | 4/2016 | Wells |

FOREIGN PATENT DOCUMENTS

CA 2894114 A1 12/2015

*Primary Examiner* — Joel Ajayi
(74) *Attorney, Agent, or Firm* — Carr & Ferrell LLP

(57) ABSTRACT

Systems and methods for short message service message management are provided herein. A method includes initiating a short message service (SMS) message session on a short message service (SMS) center for a first user equipment (UE) using a telephone number of the first UE, and facilitating exchange of SMS message session messages between the first UE and a second UE using the SMS center. The first UE uses a browser client or an application executing on the first UE to receive and send the SMS message session messages.

16 Claims, 7 Drawing Sheets

200

```
┌─────────────────────────────────────────────┐
│     Removing a legacy SIM card from a UE    │
│                     202                     │
└─────────────────────────────────────────────┘
                       ↓
┌─────────────────────────────────────────────┐
│ Replacing the legacy SIM with a SIM that is │
│          only data network enabled          │
│                     204                     │
└─────────────────────────────────────────────┘
                       ↓
┌─────────────────────────────────────────────┐
│ Provisioning, by a server, a dialer and     │
│        messaging application to the UE      │
│                     206                     │
└─────────────────────────────────────────────┘
                       ↓
┌─────────────────────────────────────────────┐
│ Disabling/Replacing a native dialer and     │
│        messaging program on the UE          │
│                     208                     │
└─────────────────────────────────────────────┘
                       ↓
┌─────────────────────────────────────────────┐
│ Registering the UE for direct calls and     │
│ calls from other users on the business      │
│              telephone system               │
│                     210                     │
└─────────────────────────────────────────────┘
                       ↓
┌─────────────────────────────────────────────┐
│ Transferring a mobile telephone number      │
│ associated with the UE to a private branch  │
│              exchange (PBX)                 │
│                     212                     │
└─────────────────────────────────────────────┘
                       ↓
┌─────────────────────────────────────────────┐
│ Attaching the mobile telephone number an    │
│           extension on the PBX              │
│                     214                     │
└─────────────────────────────────────────────┘
```

FIG. 2

ND METHODS

CROSS REFERENCE TO RELATED APPLICATIONS

This application is a continuation of U.S. patent application Ser. No. 14/971,760, filed on Dec. 16, 2015, which is a continuation-in-part of U.S. patent application Ser. No. 14/737,255, filed on Jun. 11, 2015, which claims the priority benefit of U.S. Provisional Application No. 62/012,144, filed on Jun. 13, 2014. The aforementioned patent applications are hereby incorporated by reference herein in their entirety, including all references and appendices cited therein.

FIELD OF THE TECHNOLOGY

The present disclosure relates generally to telecommunications, and, more particularly, to systems and methods that permit SMS message sessions during which users can establish and seamlessly continue SMS messaging when switching between devices.

BACKGROUND OF THE DISCLOSURE

Businesses typically have separate voice and data networks and different wireline and wireless service providers. Furthermore, business activity is increasingly mobile, conducted outside of offices, with employees often telecommuting from a home office or working on the road. In the sales industry, service people engineer sales through making and receiving a series of calls to customers and company contacts. Mobile cellphone expenses remain high despite economizing efforts to reduce the quantity of calls and high mobile phone bills, and mobile phones are still primarily being used on mobile networks when IP/digital phones are being used on private branch exchange (PBX) platforms. Additionally, competing priorities lead to communication bottlenecks, sales delays, and increased stress. By integrating mobile communication devices and office phone systems, a user's mobile communication device may become an extension of the office phone system for more direct access to and from important company and customer contacts and access to PBX functionalities. The systems and methods of the present disclosure may decrease mobile cellphone bills for businesses, eliminate mobile long distance costs, and ensure that priority calls are handled more efficiently while other calls are responded to more immediately.

SUMMARY

According to some embodiments, the present disclosure is directed to a method, comprising: (a) initiating a short message service (SMS) message session on a an SMS center for a first user equipment (UE) by receiving a telephone number of the first UE; and (b) facilitating exchange of SMS message session messages between the first UE and a second UE using the SMS center, the first UE using a browser client or an application executing on the first UE to receive and send the SMS message session messages.

According to some embodiments, the present disclosure is directed to a method, comprising: (a) receiving a short message service (SMS) message from an SMS center from a first user equipment (UE); (b) placing the SMS messages in an SMS messages session facilitated by an SMS center; and (c) providing access to the SMS messages on a third UE by: (i) receiving, by the SMS center, the telephone number of the second UE from a browser client of the third UE; and (ii) transmitting the SMS messages to the browser client of the third UE.

According to some embodiments, the present disclosure is directed to a short message service (SMS) server, comprising: (a) a processor; and (b) a memory that stores executable instructions, the processor executing the instructions to: (i) manage a short message service (SMS) message session between a first user equipment (UE) and a second UE, wherein the SMS session is identified by a telephone number for the first UE or the second UE; (ii) receive a request from a third UE to join the SMS session, the SMS session comprising any SMS messages transmitted between the first UE and the second UE; and (iii) join the third UE into the SMS session.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 2 is a flowchart of an example method for adding a UE as an extension on a PBX.

DETAILED DESCRIPTION

Figure 1:
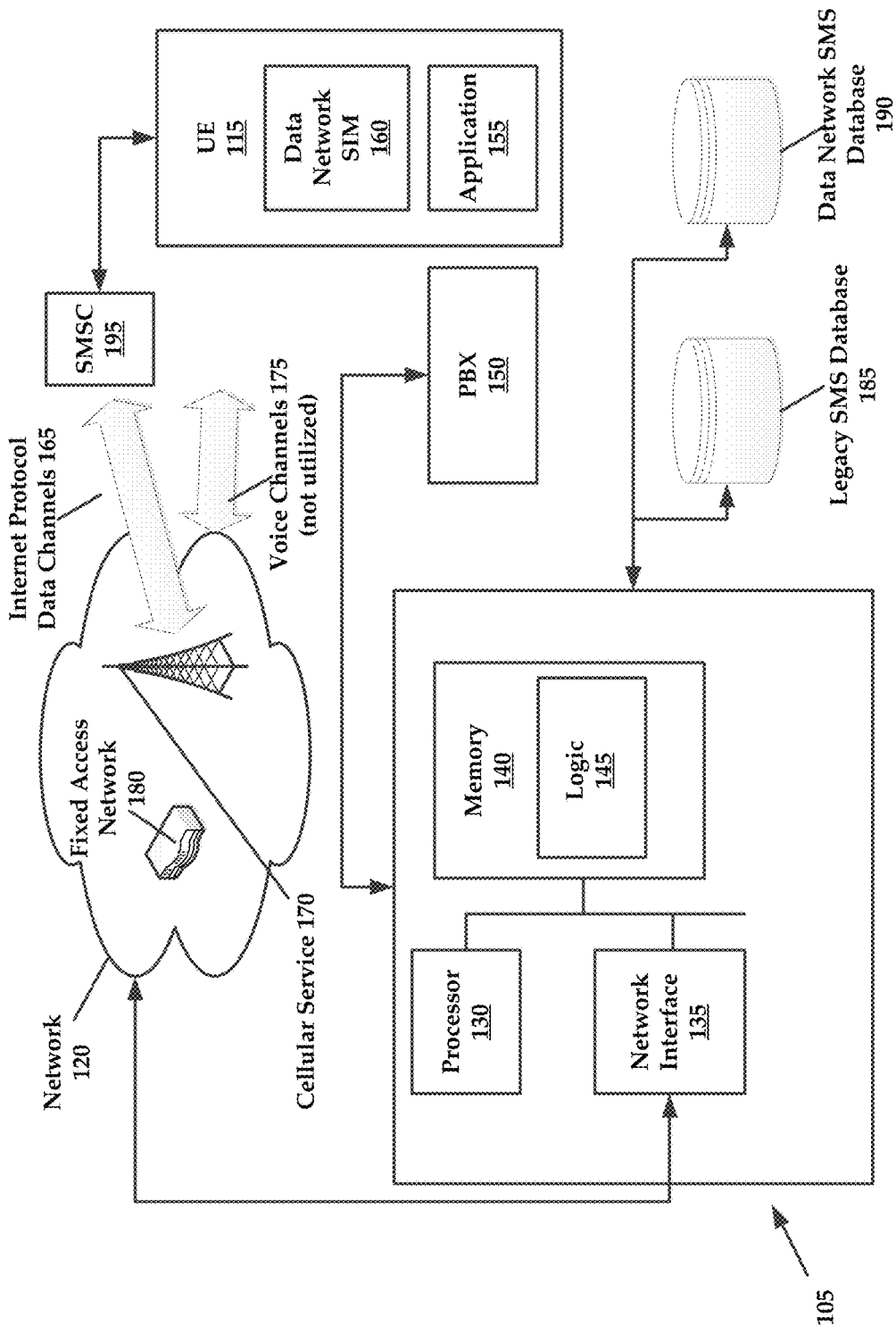
FIG. 1 is a schematic diagram of an exemplary computing architecture that can be used to practice aspects of the present disclosure.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises"

and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

FIG. 1 illustrates an exemplary architecture for practicing aspects of the present disclosure. The architecture comprises a server system, hereinafter "system 105" that is configured to provide various functionalities, which are described in greater detail throughout this document. Generally the system 105 is configured to communicate with client devices, such as user equipment (UE) 115. The UE 115 may include, for example, a Smartphone, a laptop, a computer, or other similar computing device. An example of a computing device that can be utilized in accordance with the present disclosure is described in greater detail with respect to FIG. 4.

The system 105 may communicatively couple with the UE 115 via a public or private network, such as network 120. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), LTE, GPRS, EDGE and 1×RT, 3G systems such as EV-DO, W-CDMA (including HSPA), as well as 4G systems that are deployed widely which utilize HSPA+, WIMAX and RIM (Research in Motion, Limited) duplex paging network, Bluetooth radio, or an IEEE 802.11-based radio frequency network. The network 120 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The system 105 generally comprises a processor 130, a network interface 135, and a memory 140. According to some embodiments, the memory 140 comprises logic (e.g., instructions) 145 that can be executed by the processor 130 to perform various methods. The system 105 can comprise a session initiation protocol (SIP) server, although other Internet telephony systems may follow SIP standard protocols as defined by the ITU (International Telecommunications Union), such as a PBX system that follows SIP standard protocols.

Generally, the present disclosure encompasses systems and methods for directly connecting a mobile communication device (UE 115) to an office phone system, allowing the user of the UE 115 to be accessible to receive voice and data communications as described herein as if the user was located in the same premise as his colleagues.

In some embodiments, a UE 115 is a personal computer, handheld computing system, telephone, mobile computing system or any other computing system. Furthermore, users of the present systems and methods purchase a service comprising a data plan for their mobile communication devices to access a data network that will allow calling, roaming, or text messaging. A mobile Internet data plan may have various levels of data such as 500 MB, 2 GB, 6 GB, or other amount of data. In some embodiments, the calling, domestic roaming, or text messaging is unlimited.

In various embodiments, businesses have existing PBX telephone exchange systems 150, which are most commonly analog or digital. The PBX 150 may be traditional, known to persons having ordinary skill in the art, or virtual Internet-based. In some embodiments, the virtual Internet-based PBX is a cloud-based hosted virtual PBX. The PBX 150 can also comprise an IP-based physical device hosted on-site.

In some embodiments of the present disclosure, a user will insert a data network subscriber identity module (SIM) 160 into the user's programmable UE 115 and then install a mobile dialer and text messaging application 155 that will be stored on the UE 115. In various embodiments, the SIM 160 will only utilize data channels 165 of a cellular service 170 (which can be included as a part of, or an embodiment of, the network 120). To be sure, the data channels 165 utilized are Internet protocol based data channels. Thus, where communication over a data channel is described herein, it is to be understood that the communication occurs over one or more Internet protocol based data channels, whether the communication be voice or messaging.

The application 155 may disable and/or replace the native dialer and text messaging program on the UE 115. Typically, the UE 115 would utilize the voice channels 175 of the cellular service 170 to conduct call sessions and the signaling channel to conduct SMS messaging. Using the application 155, call sessions and SMS messages can be conducted through the data channels 165 of the cellular service 170. In some embodiments, if available, the UE 115 can utilize a fixed access data network 180, such as a WiFi network. The UE 115 can actively select the fixed access network 180 if it has a higher available bandwidth or service quality than the cellular service 170.

In one embodiment, the system 105 comprises a short service message center (SMSC) 195 that is specifically configured to facilitate the transmission of SMS messages between end user devices (including the UE 115) over the data channels 165 of the cellular service 170. The system 105 can also comprise a short message peer-to-peer (SMPP) service, an extensible messaging and presence protocol (XMPP) service and/or Jabber server, as well as other services and/or controllers that are used to facilitate end user to end user messaging over a network.

The SMSC 195 can include an SMSC that is disposed as an intermediary between the system 105 and the cellular service 170, which employs a standard SMSC to provide its own SMS service. For context, an SMS message is transmitted through a signaling channel of the SMSC of the cellular service 170. The SMSC 195 of the present disclosure is implemented to mimic the functionality of the legacy/standard SMSC of the cellular service 170. For example, in some embodiments, the SMSC 195 utilizes data network protocols such as HTTP to provide messaging services. The SMSC 195 can simplify the standard method used by a legacy SMSC to provide SMS services.

For context, in a legacy SMSC, a Mobile Switching Center (MSC) is in charge of switching the connection over to the correct mobile station. The cellular service 170 also employs a Visitor Location Register (VLR) attached to each MSC, which helps to narrow down the exact location of the cell where the receiving handset is currently located. The message is then finally transferred to the corresponding Base Station System (BSS). The BSS consists of transceivers which send and receive information over the air, to and from the mobile station. This information is passed over the signaling channels so the mobile can receive messages even if a voice or data call is going on. The BSS is the final device that transmits the text message to the correct mobile.

Advantageously, the SMSC 195 can employ a data network SMS database 190 that can be used to store information regarding sending, receiving, delivery, and receipt of SMS messages. The SMSC 195 can be used to manage and route messages depending on the phone number/extension that the message was set to. As long as the UEs are connected to a network they can send and receive messages through the SMSC 195 without the use of base stations as is currently required in the cellular service 170.

The present disclosure can be extended to allow for text messaging services across multiple environment, for example, through a web-based interface on a desktop to multiple platforms outside of the carrier SMS such as Google, AIM, MSN and others who utilize XAMPP technology. Additionally, various levels and types of encryption can be utilized to ensure security of SMS messages, which is currently unavailable to SMS services provided in the cellular service 170.

In some embodiments, calls and SMS messages are not transmitted and received using an Unstructured Supplementary Service Data (USSD) protocol but through the dialer and messaging application 155 using a data transmission protocol on a data channel of a network, which could be a cellular service or a fixed access network.

Simultaneously, the application 155 may register the UE 115 for direct calls along with calls from other users on the system 105. In one embodiment, a user's mobile telephone number, in various embodiments, would be transferred and attached as an extension on the business' PBX 150. The user's mobile telephone number would be the direct inward dialing (DID) number, and the main phone number of the business would remain with the mobile telephone DID number attached as an extension on the business' PBX 150. Call sessions occurring on the office phone system 105 would eliminate cellular airtime minutes and long distance costs, that would be incurred if the UE 115 were using the cellular service.

In various embodiments, the user may receive calls from another extension in the office phone system 105. Additionally, the user may receive calls from outside callers who call the main business phone number and reach the user's extension through an auto attendant, hunt group, or agent group implemented through the system 105. An outside caller may also reach the user by calling the user's extension directly.

The user would call outside callers, in some embodiments, in the same way the user was using the UE 115 before engaging the systems and methods of the present disclosure. Furthermore, whether the user makes or receives calls from his desk in the office, mobile phone, or at home, the service would be ubiquitous to the caller. In various embodiments, the user could set up whether the business name and office phone number or his personal name and telephone number would show up on the caller ID in the evening or during business hours, depending on preferences.

Furthermore, through the systems and methods of the present disclosure, the user may utilize PBX features on the UE 115 that may be customized to their business needs. Some exemplary PBX features accessible on the UE 115 include a single number to reach the user regardless of location, the ability to directly call another extension within the office, do not disturb, transfer, car park, intercom, paging, call recording, voicemail to e-mail messaging, one-button automatic call back, hunt group, auto attendant, and a myriad of other features.

In some embodiments, the system 105 will employ changes to the SMS databases that are used by the UE 115. For example, in some embodiments, the UE 115 may initially utilize a legacy SMS database 185 prior to configuration for use with the system 105. When the UE 115 is provisioned for use with the system 105 by installing a data network enabled SIM and the application 155, the system 105 can create a new data network SMS database 190 that is used for SMS messages transmitted and received using the data network enabled subscriber identity module (SIM).

According to some embodiments, the system 105 is configured to import the content of the legacy SMS database 185 into the new data network SMS database 190.

FIG. 2 is a flowchart of an example method 200 for adding a UE as an extension on a PBX. The method 200 begins with a user removing 202 a legacy SIM card from their UE. The method 200 then includes the user replacing 204 the legacy SIM with a SIM that is only Internet data network enabled. To be sure, in some embodiments, the new SIM is only enabled to work on Internet data network channels (e.g., using only Internet data protocols, rather than voice channels).

To be sure, cellular services provide both voice channels and data channels for their subscribers or users. Some services allow for simultaneous use of both the voice and data channels, while others allow for use of one or the other, but not both at the same time. Cellular service providers utilize sets of frequencies for voice data, while other frequencies are designated only for data (packet) transmission.

The systems and methods of the present technology utilize only data channels (e.g., frequency bands) for both call sessions and SMS. The UEs are configured to utilize the present disclosure by provisioning 206, by a server (such as the system 105 or a third party application service), a dialer and messaging application 155 to the UE 115. For example, the UE 115 can be used to download the application 155. The application 155 is stored on the UE 115 and executed by the processor of the UE 115 provide various functionalities.

In one embodiment, method 200 includes the application replacing 208 a native dialer and messaging program on the UE 115. As mentioned above, the UE 115 comprises an installed data network enabled subscriber identity module (SIM) 160.

Next, the method 200 includes registering 210 the UE 115 for direct calls and calls from other users on the business telephone system 105 and transferring 212 a mobile telephone number associated with the UE 115 to a private branch exchange (PBX) 150.

The method 200 then includes attaching 214 the mobile telephone number as an extension on the PBX 150. The user can then utilize their UE 115 as if it were physically present in an office, such as a desk phone. For example, if another caller calls the extension of a user who has registered their UE 115 on the business telephone system 105, the PBX 150 will identify the UE 115 as any extension and ring the extension, which causes the UE 115 to ring.

To be sure, because the UE 115 is provisioned with a data network enabled SIM 160, calls and SMS messages for the UE 115 are not transmitted and received using an Unstructured Supplementary Service Data (USSD) protocol but through the dialer and messaging application 155 using a form of data transmission protocol that provides Internet access.

In some embodiments, the installation of the application 155 disables the cellular service 170 as a means for placing or receiving calls, except for emergency calls (in some embodiments). Thus, all calls are placed and received through the dialer and messaging application 155 using data channels 165 of the cellular service 170. Stated otherwise, the dialing dialer and messaging application 155 renders the UE 115 unable to utilize the voice channels 175 of cellular services 170. The UE 115 executes all call sessions through the dialer and messaging application 155 using only data channels 165 of the cellular service 170.

In some embodiments, the UE 115 can utilize both the voice channels and data channels of the cellular service 170 using the application 155. The application 155 is configured to actively select a best performing channel, whether that channel is a voice channel or data channel of a cellular service or alternatively a data channel of a WiFi or other fixed location data network.

Figure 3:
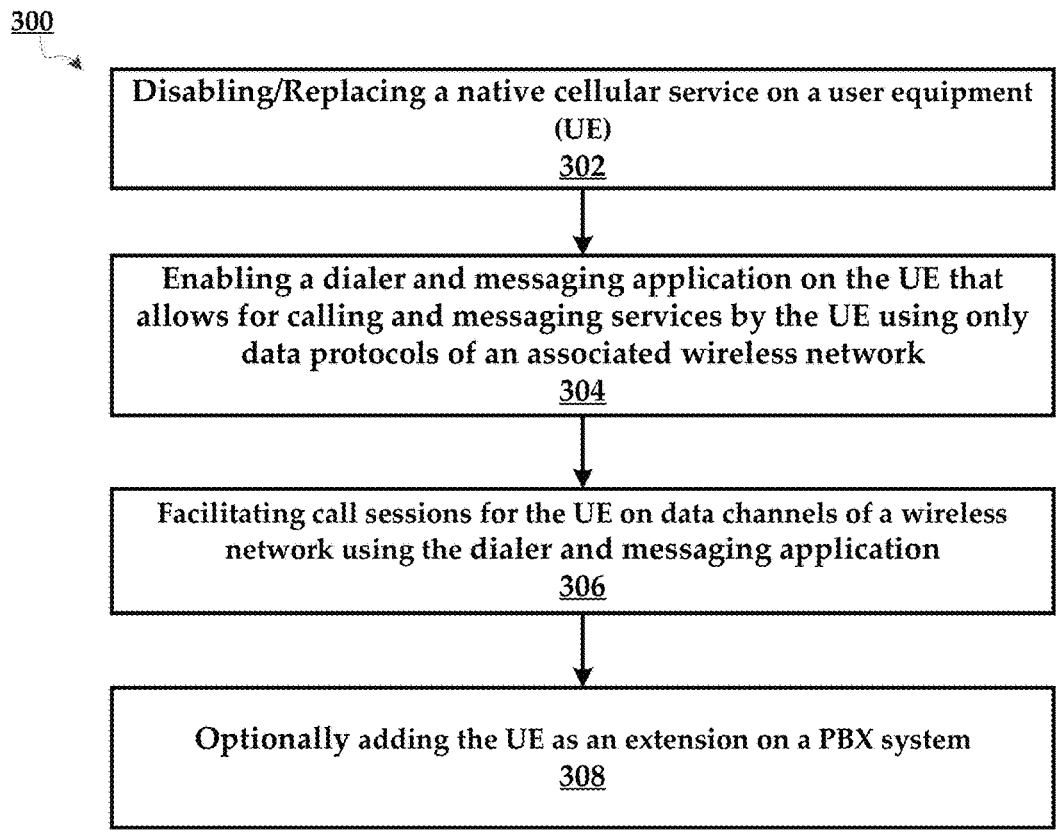
FIG. 3 is a flowchart of an example method for enabling call sessions and messaging for a UE over only the data channels of a network.

FIG. 3 is a flowchart of an example method 300 that can be executed to allow a UE to utilize the present technology. For example, the method 300 can include replacing 302 a native cellular service on a user equipment (UE). Next, the method 300 includes enabling 304 a dialer and messaging application on the UE that allows for calling and messaging services by the UE using only data protocols of an associated wireless network. Again, the wireless network could include a cellular service or a fixed access network, such as a WiFi network or home network.

Enabling the dialing and messaging application can include installing the application, which sets an icon on a UI (user interface) of the UE. In some embodiments, the application disables or replaces the native dialer and messaging applications that were previously utilized by the UE and sets the network enabled dialing and messaging application as the primary application for facilitating calls and messaging. Thus, when the user of the UE desires to place or answer a call, the dialing and messaging application will be used rather than the native dialing features of the UE. In some embodiments, the native dialer can still be enabled to allow the user of the UE to place emergency phone calls.

The method 300 can include facilitating 306 call sessions for the UE on Internet data channels of a wireless network using the dialer and messaging application.

The method 300 can optionally include adding 308 the UE as an extension on a PBX system, although it will be understood that utilizing the UE through a PBX system is not required in all embodiments. To be sure, the application 155 can allow the UE 115 to engage in call sessions on the data channels of the cellular service without adding the UE 115 into a PBX as part of the enabling process. Embodiments where the UE is added to a PBX are useful when the end user desires to utilize their UE (typically a mobile computing device) as a softphone device. For example, the user can utilize a mobile phone as an end point for their office extension. When the user is traveling the user can utilize their UE as if they were using their office phone.

Figure 4:
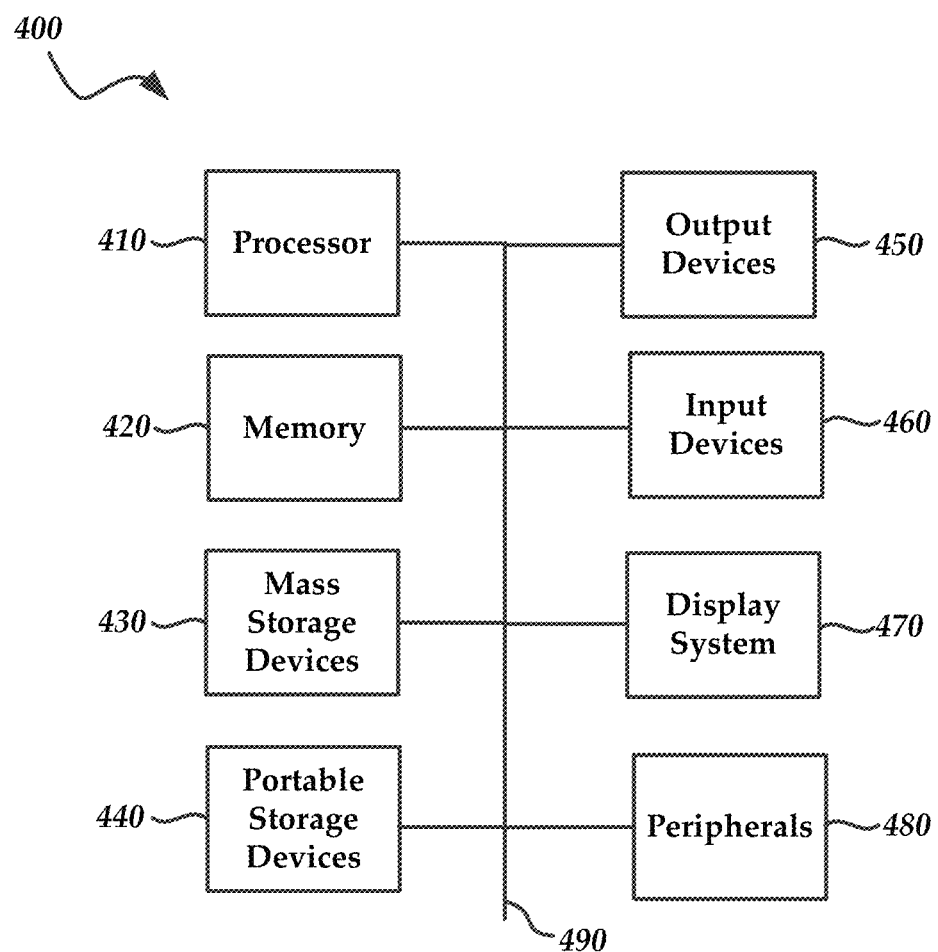
FIG. 4 is a diagrammatic representation of a computer system or a machine, within which a set of instructions for causing the machine to perform any one or more of the methodologies discussed herein, can be executed.

FIG. 4 illustrates an exemplary computing system 400 that may be used to implement embodiments of the disclosed technology. The computing system 400 may be implemented in the contexts of the likes of computing systems, networks, servers, or combinations thereof. The computing system 400 includes one or more processor units 410 and main memory 420. Main memory 420 stores, in part, instructions and data for execution by processor unit 410. Main memory 420 may store the executable code when in operation. The computing system 400 of FIG. 4 further includes a mass storage device 430, portable storage device 440, output devices 450, user input devices 460, a graphics display system 470, and peripheral devices 480.

The components shown in FIG. 4 are depicted as being connected via a single bus 490. The components may be connected through one or more data transport means. Processor unit 410 and main memory 420 may be connected via a local microprocessor bus, and the mass storage device 430, peripheral devices 480, portable storage device 440, and graphic display system 470 may be connected via one or more input/output (I/O) buses.

Mass storage device 430, which may be implemented with a magnetic disk drive, an optical disk drive, or a solid state drive, is a non-volatile storage device for storing data and instructions for use by processor unit 410. Mass storage device 430 may store the system software for implementing embodiments of the present disclosure for purposes of loading that software into main memory 420.

Portable storage device 440 operates in conjunction with a portable non-volatile storage medium, such as a floppy disk, compact disk, digital video disc, or USB storage device, to input and output data and code to and from the computing system 200. The system software for implementing embodiments of the present disclosure may be stored on such a portable medium and input to the computing system 400 via the portable storage device 440.

User input devices 460 provide a portion of a user interface. User input devices 460 may include one or more microphones, an alphanumeric keypad, such as a keyboard, for inputting alpha-numeric and other information, or a pointing device, such as a mouse, a trackball, stylus, or cursor direction keys. User input devices 460 may also include a touchscreen. Additionally, the computing system 400 includes output devices 450. Suitable output devices include speakers, printers, network interfaces, and monitors.

Graphic display system 470 may include a liquid crystal display (LCD) or other suitable display device. Graphic display system 470 receives textual and graphical information, and processes the information for output to the display device.

Peripheral devices 480 may include any type of computer support device to add additional functionality to the computing system 400. Peripheral devices 480 may include a GPS navigation device, telematics device (e.g., OnStar), entertainment device, GSM modem, satellite radio, router, and the like.

The components provided in the computing system 400 of FIG. 4 are those typically found in computing systems that may be suitable for use with embodiments of the present disclosure and are intended to represent a broad category of such computer components that are well known in the art. Thus, the computing system 400 may be a personal computer, handheld computing system, telephone, mobile computing system, workstation, server, minicomputer, mainframe computer, wearable, or any other computing system. The computer may also include different bus configurations, networked platforms, multi-processor platforms, etc. Various operating systems may be used including UNIX, LINUX, CHROME, WINDOWS, MAC OS, PALM OS, ANDROID, IOS, QNX, and other suitable operating systems.

In general, the following embodiments contemplate systems and methods that provide SMS services across a plurality of UEs. A user can conduct an SMS message session or thread with a recipient using a first UE. The user can switch to a second UE and continue the SMS session or thread using the second UE, where the second UE accesses the SMS session or thread using a browser client and a telephone number for the user. The SMS messages will be displayed on whatever device the user is currently using in such a way that the SMS session or messages appear to have been sent or received from that device, regardless of whether the user has switched devices during the SMS message session. The user can send and receive SMS messages through a system portal using any device. The user logs into the SMS portal through their web browser client and inputs a phone number associated with the user. It is noteworthy that the user need not utilized the cellular telephone or UE associated with the telephoned number.

Figure 5:
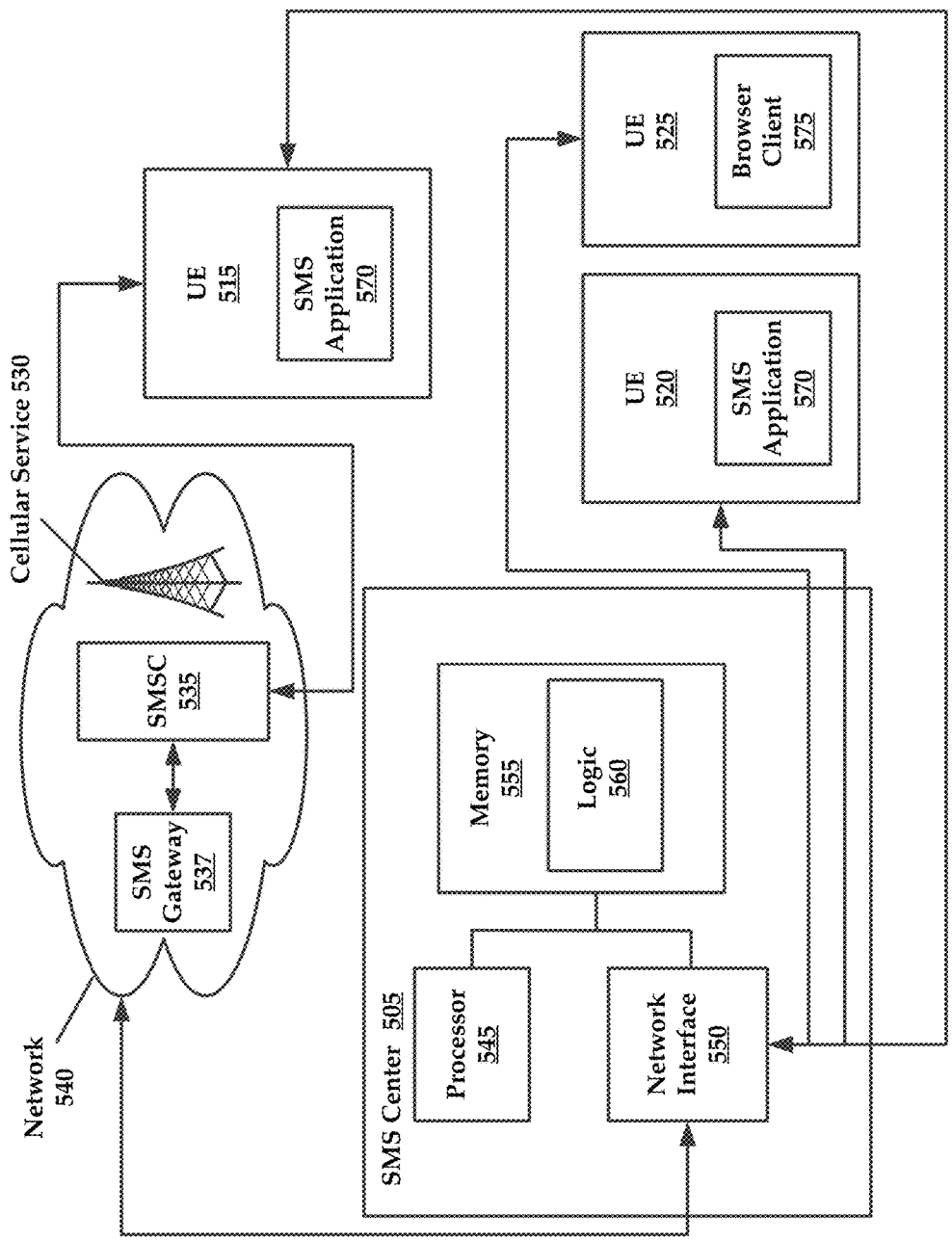
FIG. 5 is a schematic diagram of an exemplary computing architecture that can be used to practice aspects of the present disclosure.

FIG. 5 illustrates an exemplary architecture for practicing aspects of the present disclosure. The architecture comprises a server system, hereinafter "system 505" that is configured to provide various functionalities, which are described in greater detail throughout this document. Generally the system 505 is configured to communicate with client devices, such as user equipment (UE) 515, UE 520, and UE 525. The UE 515 may include, for example, a Smartphone, a laptop, a computer, or other similar computing device. An example of a computing device that can be utilized in accordance with the present disclosure is described in greater detail with respect to FIG. 4.

In some embodiments, the UE 515 is a cellular telephone that operates on a cellular service 530 such as a cell phone network. The UE 520 can include a second cellular telephone that operates on the same (or different) telecommunications network. The UE 525 is a laptop or other computing device that can utilize a data network. The UE 525 can include a device that is incapable of using a cell phone network, or uses a cell phone network one of a number of possible communications networks.

In some embodiments, the cellular service 530 can utilize a short message service (SMSC) center 535 for facilitating SMS messages between cellular devices. The cellular service 530 can also comprise an SMS gateway 537 that allows SMS messages to be transmitted to data networks, such as the data network utilized by the system 505.

The system 505 may communicatively couple with the UEs 515-520 via a public or private network, such as network 540. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), LTE, GPRS, EDGE and 1×RT, 3G systems such as EV-DO, W-CDMA (including HSPA), as well as 4G systems that are deployed widely which utilize HSPA+, WIMAX and RIM (Research in Motion, Limited) duplex paging network, Bluetooth radio, or an IEEE 802.11-based radio frequency network. The network can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The system 505 generally comprises a processor 545, a network interface 550, and a memory 555. According to some embodiments, the memory 555 comprises logic (e.g., instructions) 560 that can be executed by the processor 545 to perform various methods. The system 505 can comprise an SMS center system/server, although the system 505 can utilize other Internet telephony systems that follow, for example, session initiation protocol (SIP) standard protocols as defined by the ITU (International Telecommunications Union). In some embodiments, the system 505 is coupled to the SMS gateway 537 of the cellular service 530. The system 505 generally transmits SMS messages to cellular UEs through the SMS gateway 537, and receives SMS messages from the cellular UEs from the SMS gateway 537.

The present disclosure can be extended to allow for SMS messaging services across multiple environments, for example, through a web-based interface on a desktop to multiple platforms outside of the carrier SMS such as Google, AIM, MSN and others who utilize XAMPP technology.

Additionally, various levels and types of encryption can be utilized to ensure security of SMS messages, which is currently unavailable to SMS services provided in the cellular service 530.

The system 505 can also comprise a short message peer-to-peer (SMPP) service, an extensible messaging and presence protocol (XMPP) service and/or Jabber server, as well as other services and/or controllers that are used to facilitate end user to end user messaging over a network.

In some embodiments, the system 505 can utilize PUSH and/or PULL protocols for transmitting and receiving messages from the UEs 515-525.

The SMSC 535 is disposed as an intermediary between the system 505 and the cellular service 530, which employs a standard SMSC to provide its own SMS service. For context, an SMS message is transmitted through a signaling channel of the SMSC of the cellular service 530.

For context, in a legacy SMSC, a Mobile Switching Center (MSC) is in charge of switching the connection over to the correct mobile station. The cellular service 530 also employs a Visitor Location Register (VLR) attached to each MSC, which helps to narrow down the exact location of the cell where the receiving handset is currently located. The message is then finally transferred to the corresponding Base Station System (BSS). The BSS consists of transceivers which send and receive information over the air, to and from the mobile station. This information is passed over the signaling channels so the mobile can receive messages even if a voice or data call is going on. The BSS is the final device that transmits the text message to the correct mobile.

Advantageously, the SMSC 535 can employ a network SMS database that can be used to store information regarding sending, receiving, delivery, and receipt of SMS messages. The SMSC 535 can be used to manage and route messages depending on the phone number/extension that the message was set to. As long as the UEs are connected to a network they can send and receive messages through the SMSC 535 without the use of base stations as is currently required in the cellular service 530.

In one embodiment, the system 505 is configured to allow a user to seamlessly continue SMS message sessions using a first UE, such as UE 515 and a second UE, such as UE 525. By way of example, a first user can utilize the UE 515 which is a cellular telephone. A second user can utilize the UE 520 which is another cellular telephone. The first and second users can transmit SMS messages to one another using an SMS application 570 that is enabled on the on the UEs. The SMS application 570 mediates SMS sessions with the system 505, which functions as an SMS center. The SMS center can create an SMS session when SMS messages are transmitted between the UEs using the SMS application 570. Thus, there is a context or relationship between the UEs that the SMS center maintains as an SMS session.

In some embodiments, the SMS center can establish and maintain the SMS session and its context by associating a phone number of the UEs with the SMS session, when the UEs are a cellular device. The SMS center can also utilize other identifiers such as IMEL MAC addresses, IP addresses or other identifying information.

Advantageously, the SMS center can maintain the SMS message session when the first user switches devices. For example, the first user can switch from UE 515 to UE 525. By way of example, the first user can be using UE 515 when they are mobile or out of the office. When the user returns to their office they can join the SMS messaging session from their desktop or laptop computer. Thus, the user can conveniently switch from SMS messaging on UE 515 to SMS messaging on UE 525 seamlessly. That is, the second user UE 520 will not be able to detect that the first user has switched UEs.

The UE 525 can join the SMS session using a browser client 575. For example, the first user can launch their browser client 575 and open a URL that directs opens access to the SMS service provided by the SMS center. To join the SMS session, the first user inputs their telephone number (or other similar account identifier) associated with the UE 515. Again, the telephone number identifies the SMS session for the SMS center. The SMS center can add the UE 525 to the SMS session, which causes any previous messages transmitted between UE 515 and UE 520 to appear in the browser client 575.

Thus, the user can utilize a browser client on any device to access an SMS session by inputting a telephone number of an associated cellular telephone or other identifier. In some embodiments, the SMS center can require users to utilize authentication credentials for security purposes, in addition to inputting their telephone number.

In another example use case, a first user is awaiting an SMS message from a second user. The first user is utilizing a cellular telephone to communicate with the second user. Unfortunately, the first user is in a location where no cellular service is available, but a data connection through a WiFi access point is available. Without access to the system 505 the UE of the first user would be unable to receive or transmit messages to or from the second user because of the lack of cellular service, which is a necessary prerequisite for sending and/or receiving SMS messages using standard telephony SMS services.

The first user can utilize the present disclosure to receive and send SMS messages by using the data connection. For example, the first user can launch the browser client on their cellular device and log onto SMS service of the SMS center. The SMS center can add the UE to the SMS session and enable the first user to send and/receive SMS messages through the browser client.

Figure 6:
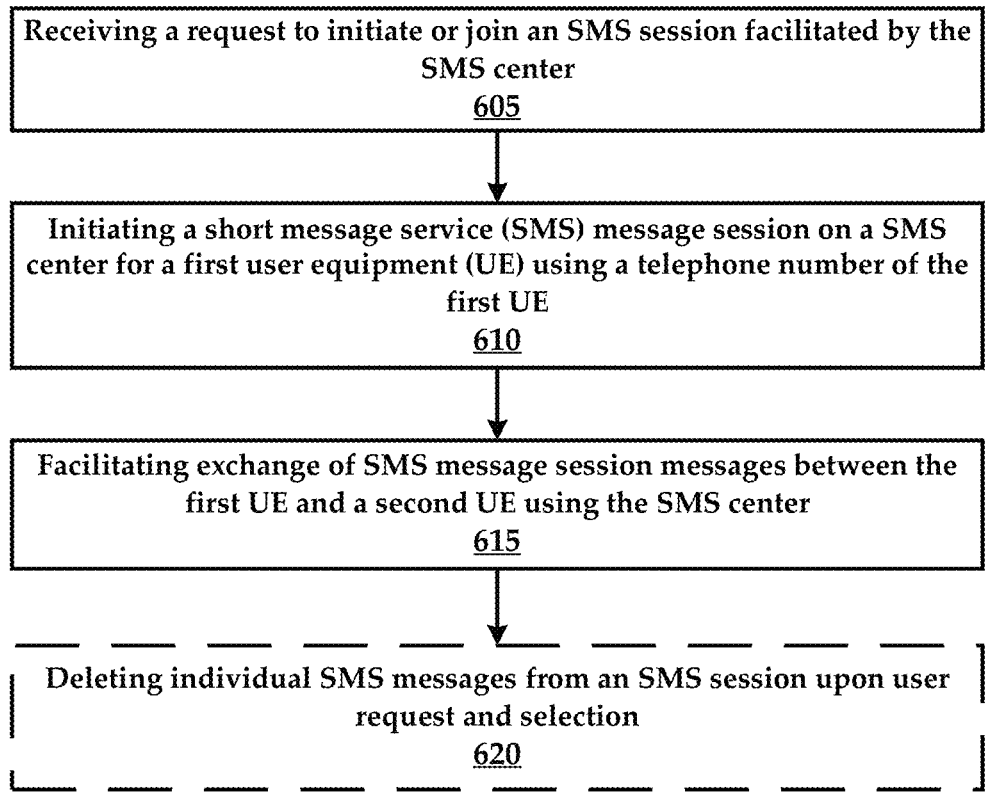
FIG. 6 is a flowchart of an example method for SMS center SMS message sessions.

FIG. 6 is a flowchart of an example method for managing an SMS session on an SMS center. The method can include an SMS center receiving 605 a request to initiate or join an SMS session facilitated by the SMS center. To be sure, the SMS center is a separate and distinct SMS service relative to an SMS center that is provided by a cellular service (as illustrated in FIG. 5). The SMS center, referred to as system 505, provides the seamless SMS message sessions of the present disclosure. As mentioned above, this can include the user launching a browser client, navigating to a URL specified by the SMS center, and inputting their telephone number—just as an example. The request can be initiated by UE to which the telephone number belongs, or any other UE that the user desires to utilize.

Next, the method can comprise initiating 610 a short message service (SMS) message session on a short message service (SMS) center for a first user equipment (UE) using a telephone number of the first UE. Again, the first UE can include any of the end user computing devices described herein. The SMS session is maintained at the server level, in contrast with SMS services that merely transmit SMS messages between UEs, where the SMS service does not retain SMS messages exchanged between the UEs as a session. Using the SMS center of the present disclosure, a user can change devices at will and access the SMS session from numerous devices.

Once the SMS center has initiated or joined the UE to the SMS session through the browser client, the method can include facilitating 615 exchange of SMS message session messages between the first UE and a second UE using the SMS center. As mentioned above the first UE uses the browser client or an application executing on the UE to receive and send the SMS message session messages.

In some embodiments, the SMS center can be optionally configured to allow for deleting 620 of individual SMS messages from an SMS session. Thus, users need not delete an entire SMS thread or group of SMS messages in order to delete messages. The user need only select an SMS message in the browser client and delete the SMS message.

Figure 7:
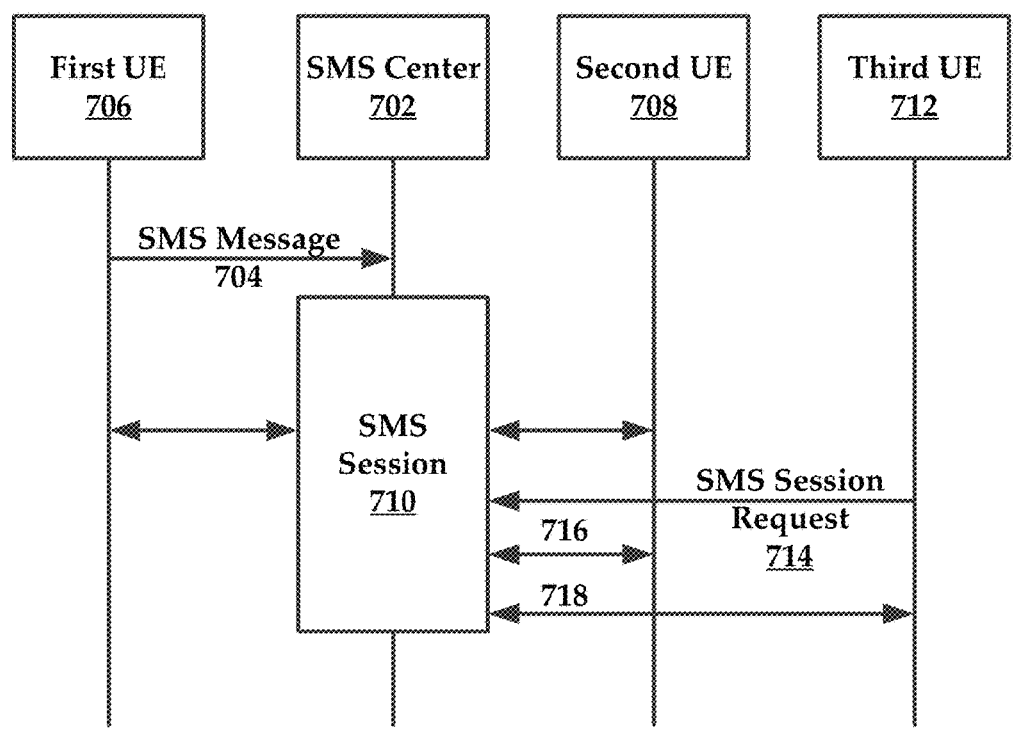
FIG. 7 is a signal flow diagram of an SMS session management method.

FIG. 7 illustrates an example method in the form of a signal flow diagram. The method is conducted by an SMS center 702 that creates and maintains SMS message sessions. The flow begins when the SMS center 702 receives a short message service (SMS) message 704 from an SMS center from a first user equipment (UE) 706. The SMS message is designated for a recipient UE, which in this instance is referred to as a second UE 708.

The SMS center 702 can place the SMS messages in an SMS messages session 710 facilitated by the SMS center 702. Any additional SMS messages transmitted between the first UE 706 and the second UE 708 are conducted within the SMS messages session 710.

Next, the SMS center 702 provides access to the SMS messages for a third UE 712 by receiving, by the SMS center, a session request 714 that include the telephone number of the second UE 708 from a browser client of the third UE 712.

The SMS center 702 can provide SMS message service between the third UE 712 and the second UE 708 through the browser client of the third UE 712. The SMS session can include any of the SMS messages exchanged between the first UE 706 and the second UE 708. The exchange of SMS messages between the second UE 708 and third UE 712 are illustrated messages 716 and 718.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), Blu-ray Disc (BD), any other optical storage medium, RAM, PROM, EPROM, EEPROM, FLASH memory, and/or any other memory chip, module, or cartridge.

The present disclosure may be implemented as a webserver or in a cloud-based computing environment. A cloud-based computing environment is a resource that typically combines the computational power of a large grouping of processors and/or that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

The present disclosure is described above with reference to exemplary embodiments. Therefore, other variations upon the exemplary embodiments are intended to be covered by the present disclosure.

What is claimed is:

1. A method for integrating a user equipment (UE) with a business telephone system, comprising:
   provisioning, by a server, a dialer and messaging application to the UE;
   replacing a native dialer and messaging program on the UE by the dialer and messaging application, wherein the UE comprises an installed data network enabled subscriber identity module (SIM);
   enabling calls or messaging through a session initiation protocol (SIP) server using the dialer and messaging application and data protocols of an associated Wi-Fi network;
   registering the UE for the calls, the calls including direct calls and calls from other users on the business telephone system, the UE configured to be unable to utilize voice channels of a cellular service for placing or receiving the calls, in which all of the calls occur through the dialer and messaging application using a communication channel of the associated Wi-Fi network;
   receiving a request from the dialer and messaging application to add the UE to a private branch exchange (PBX); and
   attaching a mobile telephone number associated with the UE as an extension on the PBX.

2. The method of claim 1, further comprising:
   receiving a telephone call at the PBX destined for a recipient; and
   forwarding the telephone call to the mobile telephone number attached as an extension on the PBX.

3. The method of claim 1, further comprising:
   receiving a telephone call at the PBX from the dialer and messaging application on the UE; and
   forwarding the telephone call to a recipient via the PBX.

4. The method of claim 1, further comprising:
   receiving a short message service (SMS) message from the UE on the associated wireless network;
   employing, by an intermediary short message service center (SMSC), a standard SMSC to provide its own SMS service, the intermediary SMSC mimicking the functionality of the standard SMSC of the cellular service; and
   forwarding the SMS message to a recipient.

5. The method according to claim 1, further comprising creating a new SMS database for SMS messages transmitted and received using the installed data network enabled SIM.

6. The method according to claim 5, further comprising importing a legacy SMS database into the new SMS database.

7. The method according to claim 1, wherein calls and SMS messages are not transmitted and received using an Unstructured Supplementary Service Data (USSD) protocol but through the dialer and messaging application installed on the UE using a data transmission protocol of a wireless network.

8. The method according to claim 1, wherein enabling the dialer and messaging application comprises: removing a legacy SIM of the UE provided by a legacy cellular service; and replacing the legacy SIM with the data network enabled SIM.

9. The method according to claim 1, wherein the request comprises the mobile telephone number of the UE.

10. The method according to claim 1, further comprising placing a shortcut icon for the dialer and messaging application on the UE.

11. A system, comprising:
    a private branch exchange (PBX);
    a server configured to integrate user equipment (UE) onto the PBX by attaching a mobile telephone number of the UE as an extension on the PBX, an application stored on the UE configured to disable or replace a native dialer and messaging program on the UE, the UE not configured to utilize voice channels of a cellular service for placing and receiving calls or messages;
    an intermediary short message service center (SMSC) that employs a standard SMSC to provide its own SMS service, the intermediary SMSC mimicking the functionality of the standard SMSC of a cellular service; and
    a session initiation protocol (SIP) server coupled with the server and the PBX that allows the UE to place and receive calls and messages via the application stored on the UE and the SIP server, the calls and messages utilizing at least one communication channel of a Wi-Fi network.

12. The system of claim 11, wherein the network further comprises a Bluetooth network.

13. The system of claim 11, wherein the network further comprises a cellular network.

14. The system of claim 11, wherein the server is further configured to receive a short message service (SMS) message from the UE on a data channel and forward the SMS message to a recipient.

15. The system of claim 11, wherein the system is configured to facilitate messaging through use of short message peer-to-peer services, extensible messaging and presence protocol (XMPP) services, XAMPP stack packages, or combinations thereof.

16. The system of claim 11, wherein the UE can utilize PBX features comprising any of direct calls to or from another extension on the PBX, do not disturb, transfer, car park, intercom, paging, call recording, voicemail to e-mail messaging, one-button automatic call back, hunt group, auto attendant, and any combinations thereof.

* * * * *